United States Patent [19]
Erwin et al.

[11] Patent Number: 5,569,986
[45] Date of Patent: Oct. 29, 1996

[54] SOFT START CONTROL APPARATUS FOR DRIVE MOTORS OF A ROTOR SPINNING MACHINE

[75] Inventors: Herzner Erwin, Möckenlohe; Götz Josef, Denkendorf, both of Germany

[73] Assignee: Rieter Ingolstadt Spinnereimaschinenbau AG, Ingolstadt, Germany

[21] Appl. No.: 407,720

[22] Filed: Mar. 21, 1995

[30] Foreign Application Priority Data

Apr. 29, 1994 [DE] Germany .................... 44 14 984.0

[51] Int. Cl.$^6$ ................ H02P 1/54; D01H 4/44
[52] U.S. Cl. ................ 318/66; 318/34; 318/41; 318/49; 364/492
[58] Field of Search .............. 318/34–89, 500–630, 318/113, 778, 729, 759, 802, 430, 825, 434, 454, 805, 807; 364/492, 200, 132

[56] References Cited

U.S. PATENT DOCUMENTS

| | | | |
|---|---|---|---|
| 3,742,370 | 6/1973 | Hansen | 318/416 |
| 4,015,178 | 3/1977 | Phillot et al. | 318/410 |
| 4,096,422 | 6/1978 | Fleming et al. | 318/454 |
| 4,328,459 | 5/1982 | McLeod, Jr. | 323/300 |
| 4,361,793 | 11/1982 | Nordell | 318/729 |
| 4,482,853 | 11/1984 | Bhavsar | 318/778 |
| 4,633,382 | 12/1986 | Upadhyay et al. | 318/808 |
| 4,765,456 | 8/1988 | Bower | 318/77 |
| 4,835,706 | 5/1989 | Asahi | 364/492 |
| 4,992,718 | 2/1991 | Kumaki | 318/768 |
| 5,086,964 | 2/1992 | Blaser | 226/106 |
| 5,194,793 | 3/1993 | Niimi | 318/568.15 |
| 5,237,250 | 8/1993 | Zeile et al. | 318/562 |
| 5,241,250 | 8/1993 | Nagasawa et al. | 318/591 |
| 5,247,237 | 9/1993 | Koyama et al. | 318/808 |
| 5,434,486 | 7/1995 | Tanaka | 318/69 |
| 5,537,178 | 10/1994 | Kapitan | 318/7 |

FOREIGN PATENT DOCUMENTS

| | | |
|---|---|---|
| 263949 | 8/1968 | Austria . |
| 2623659 | 12/1976 | Germany . |
| 129605 | 2/1977 | Germany . |
| 2626096 | 12/1977 | Germany . |
| 3630604A1 | 3/1988 | Germany . |
| 53-052909 | 5/1978 | Japan . |
| 59-198887 | 11/1984 | Japan . |
| 4245958 | 9/1992 | Japan . |

OTHER PUBLICATIONS

Japanese Patent Abstract, vol. 9, No. 92 (M–373) (1815), Apr. 20, 1985.
Japanese Patent Abstract, Dec. 3, 1986, vol. 10, No. 359 (E–460) (2416).

*Primary Examiner*—Paul Ip
*Attorney, Agent, or Firm*—Dority & Manning

[57] ABSTRACT

The rotor spinning machine includes a plurality of asynchronous motors for driving the operating elements of the machine. The motors run up from a standstill condition to an operating speed under the initial mass load of the operating elements. The machine includes a single soft-start control apparatus control circuit configured with the motors and the soft-start control apparatus for individually and successively connecting the motors to the soft-start control apparatus in a predetermined hierarchy.

4 Claims, 1 Drawing Sheet

5,569,986

SOFT START CONTROL APPARATUS FOR DRIVE MOTORS OF A ROTOR SPINNING MACHINE

BACKGROUND OF THE INVENTION

The instant invention relates to the soft start of all high-performance drive motors used as asynchronous motors for a rotor spinning machine. Asynchronous motors are used for the drive in rotor spinning machines. The installed electrical capacity of the drive is relatively high by comparison with machines for other spinning processes because the inertia masses are relatively high for each individual drive motor.

High-performance asynchronous motors are used on rotor spinning machines to drive the operating elements, particularly the rotors and opener rollers. The operating element rotors and opener rollers are driven by a separate asynchronous motor for each machine side in this instance.

The motor for main suction is also a high-performance asynchronous motor. These high-performance asynchronous motors produce a very large portion of the overall installed electrical capacity of the rotor spinning machine. The utilization of asynchronous motors has prevailed on rotor spinning machines because they require little maintenance, and are inexpensive and economical. When starting under load, these asynchronous motors produce high torque peaks which exceed the nominal torque considerably. This behavior in operation results in high mechanical stress on the drive shaft and coupling. Force transmission elements such as belts or operating elements such as rotors and opener rollers are thus subjected to great mechanical stress.

The high starting current produced as high-performance asynchronous motors are started is also disadvantageous. It causes the windings of the motor to heat up so that the electric strength is burdened. The high peak loads as the rotor spinning machine is started also burden the appertaining electrical supply network.

For these reasons asynchronous motors which were oversized because of the required acceleration of the inertia masses of the spinning machine or which are equipped with a starting aid were used. Known starting aids are the Y/delta connections, starting transformers, sliding couplings or electronic soft-start control apparatuses. Electronic soft-start control apparatuses have prevailed and are normally used when the driving power of an asynchronous motor is more than 15 kW. This characterizes a high-performance asynchronous motor. The control principle of a soft-start control apparatus is the phase control of the semiconductors. In known rotor spinning machines, a separate starting control is used for each asynchronous motor used to drive the rotors, the opener rollers, and the main suction. This represents high costs for this starting aid.

OBJECTS AND SUMMARY OF THE INVENTION

It is a principal object of the instant invention to further improve the economy of the soft start of all high-performance asynchronous motors of a rotor spinning machine. Additional objects and advantages of the invention will be set forth in part in the following description, or may be obvious from the description, or may be learned through practice of the invention.

It is a characteristic of the invention that by using only one single soft-start control apparatus of an asynchronous motor, other asynchronous motors of the rotor spinning machine are started in a controlled manner. Using one single starting control, the asynchronous motor for the main suction, for the rotor drive, and for the opener roller drive are started in a controlled manner following a selected hierarchy. The run-up time of an asynchronous motor until it reaches operating speed depends on the load. In rotor spinning machines, this is the inertia mass of the different operating elements. This is a known value. When the run-up time of the first asynchronous motor is ended, the soft-start control apparatus is switched over to actuate the start of the next motor. When the run-up time of the latter is ended, the soft-start control apparatus is again switched over to control the start of the following motor. In this manner all the asynchronous motors of a rotor spinning machine are started in turn. The soft start control is sized for the most powerful asynchronous motor. The starting control is controlled by a stepped rapid reclosing which operates as a function of time and therefore represents the run-up time.

The invention advantageously reduces the expense for devices for soft start of a rotor spinning machine and ensures nevertheless the avoidance of the advantages mentioned in the state of the art.

The characteristics of the invention and their advantageous embodiment are explained hereinafter through a preferred embodiment of the invention.

DETAILED DESCRIPTION OF THE PREFERRED EMBODIMENT

Figure 1:
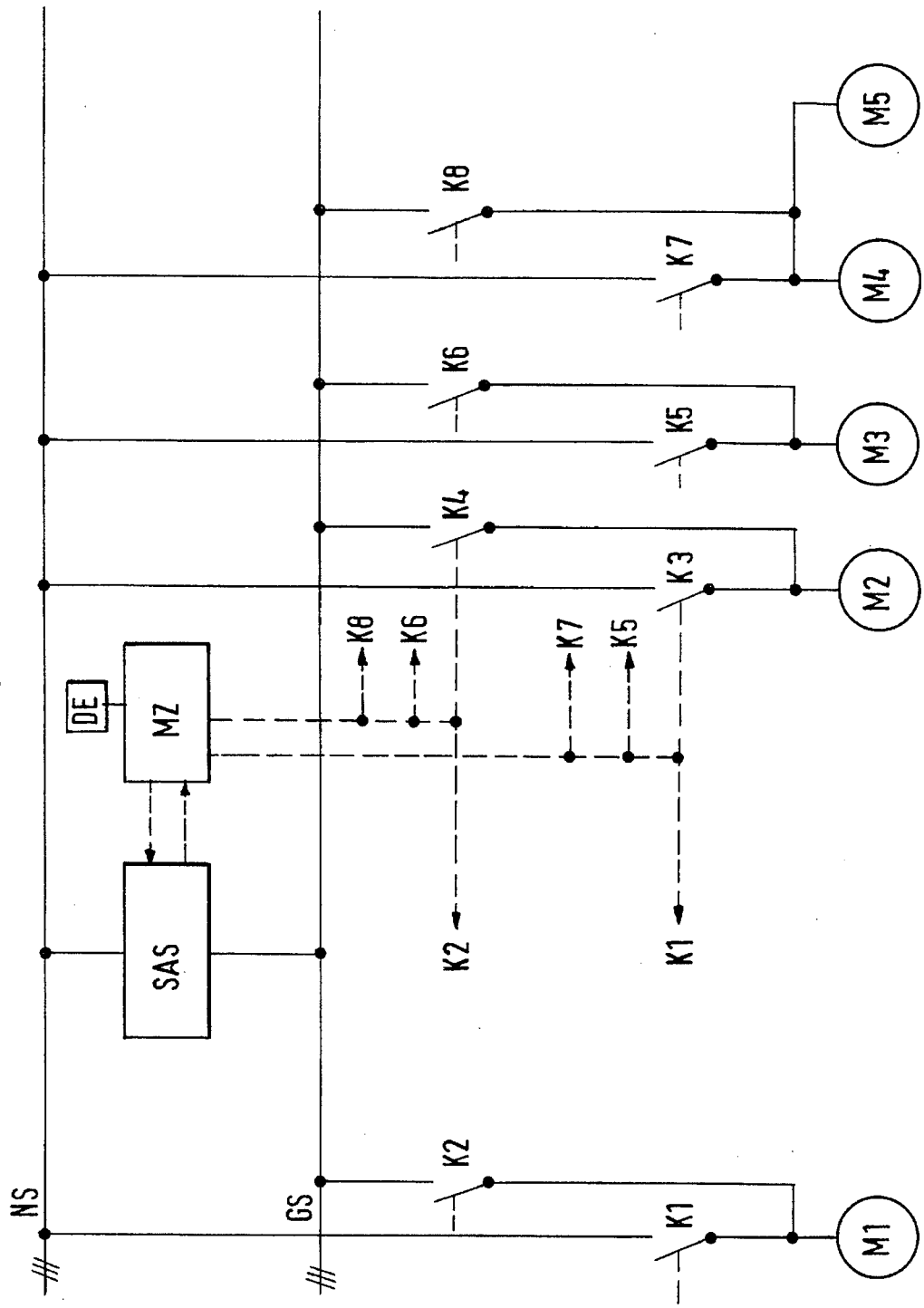
FIG. 1 shows a basic flow diagram for the soft start of the drive motors of a rotor spinning machine according to the invention.

Reference will now be made in detail to the presently preferred embodiments of the invention, one or more examples of which are illustrated in the drawing. Each example is provided by way of explanation of the invention, and not as a limitation of the invention. For example, various modifications and variations can be made in the present invention without departing from the scope and spirit of the invention.

A rotor spinning machine is basically driven via five high-performance drive motors. These are the asynchronous motors M1, M2, M3, M4, M5. The main suction is driven by the asynchronous motor M1. The rotors are located on both sides of the rotor spinning machine. Each side is therefore driven separately. The asynchronous motor M2 drives the rotor for one side from the end section. On the other machine side, the asynchronous motor M5 drives the opener rollers from the headstock. Together, these motors have an installed capacity of approximately 80 to 100 kW, whereby one motor driving the rotor is the most powerful with approximately 30 kW.

The flow diagram according to FIG. 1 shows a single-pole set-up, even though in the present case a three-phase network is used.

As shown in FIG. 1, each one of the asynchronous motors M1 to M5 can be supplied with a network voltage NS or with a primary voltage GS, on condition that the corresponding contactors K1 to K8 are properly closed. Between the plane of the network voltage and the plane of the primary voltage supply, a soft-start control apparatus SAS is installed. This soft-start control apparatus SAS and the appertaining contactors are actuated via the machine command center MZ.

The control current connections are indicated in the form of broken lines. Full lines indicate the electrical power flow.

FIG. 1 shows that only one soft-start device SAS is used to control the soft start of all the asynchronous motors M1 to M5. Auxiliary contactors are not shown in FIG. 1 for the sake of simplification.

The soft-start control apparatus SAS supplies a primary voltage GS, lower than the network voltage NS, to the lane on the output side. The soft-start control apparatus SAS is controlled by semiconductors. Within a set time, the primary voltage GS is continuously increased to the network voltage NS. The appropriate momentary value of the voltage at the motor makes it possible to limit the drawing of current and eventually the torque.

A machine operator actuates the starting button of the data input DE. This command is transmitted to the machine command center MZ. This is the signal to begin the soft-start of the rotor spinning machine. By actuating the staring button of the data input DE, the machine command center MZ controls an auxiliary contactor (not shown) which starts the SAS.

The machine command center MZ actuates the contactor K2. When contactor K2 is closed, the asynchronous motor M1 for main suction is supplied with this primary voltage GS. The asynchronous motor M1 receives the primary voltage GS for a run-up period which is pre-set and monitored by the soft-start control apparatus SAS. The duration of the run-up time is derived from the electrical parameters of the motor. At the end of the run-up time which is recognized by the soft-start control apparatus SAS and is transmitted to the machine command center MZ, the contactor K1 is closed and the contactor K2 opened simultaneously via the machine command center MZ. This process may take approximately 5 seconds. As a result, the asynchronous motor M1 is supplied from then on directly via the network voltage NS. The machine command center MZ now actuates the contactor K4 and the soft-start control apparatus SAS, and then the soft start of the asynchronous motor M2 begins. The soft-start control apparatus SAS is sized for the highest starting current reached by one of the asynchronous motors M1 to M5 being used.

When the run-up time for asynchronous motor M2 is ended, the soft-start control apparatus SAS recognizes that the primary voltage GS has reached the magnitude of the network voltage NS and the contactor K3 is closed via an auxiliary contactor (not shown) while contactor K4 is opened. After the time required for this, contactor K6 is closed. The soft start of the asynchronous motor M3 which drives the rotors of one machine side from the headstock begins. When the soft start is completed the contactor K5 is closed and contactor K6 is opened. After the time required for this the contactor K8 is closed.

The asynchronous motors M4 and M5 run up together. This is possible because their joint electrical capacity is lower than the electrical capacity of the most powerful individual drive. The soft start is carried out similarly to the preceding processes, i.e. contactor K8 opens, contactor K7 closes.

The machine command center MZ contains a program for stepped rapid closing, so that the operation of the soft-start control apparatus SAS is again actuated after completion of a run-up time until the last asynchronous motors have run up. This running up of all the asynchronous motors may be completed at the end of a total time of approximately 2 minutes. All the asynchronous motors of a rotor spinning machine have thereby undergone soft starting with only one soft-start control apparatus SAS. A travelling automatic service unit alongside the rotor spinning machine can now begin with the piecing operation.

It will be apparent to those skilled in the art that various modifications and variations can be made in the present invention without departing from the scope and spirit of the invention. For example, features illustrated or described as part of one embodiment may be used on another embodiment to yield still a further embodiment.

We claim:

1. A rotor spinning machine, comprising:

a plurality of asynchronous motors configured to drive operating elements of the spinning machine so that said motors, when running from a standstill condition to an operating speed, are loaded by the inertia masses of the operating elements;

a single soft-start control apparatus sized for at least the starting current of the most powerful of said motors; and a control circuit operably configured with said motors and said soft-start control apparatus to individually and successively connect said motors to said soft-start control apparatus in a predetermined hierarchy to bring said motors from a standstill condition to an operating speed in a predetermined sequence, thereby optimizing the load on said single soft-start control apparatus.

2. The rotor spinning machine as in claim 1, wherein said control circuit further comprises a machine command center, said machine command center configured to automatically disconnect a said motor from said soft-start control apparatus when said motor achieves its operating speed and to simultaneously operably connect a successive said motor, said successive motor being at a standstill condition, to said soft-start control apparatus.

3. The rotor spinning machine as in claim 1, wherein said soft-start control apparatus is sized for the starting current of the most powerful of said motors.

4. The rotor spinning machine as in claim 1, wherein said plurality of asynchronous motors includes at least one pair of asynchronous motors in operative communication with said control circuit so that said control circuit simultaneously connects said motor pair to said soft-start apparatus within the predetermined hierarchy.

* * * * *